(12) United States Patent
Mita

(10) Patent No.: US 11,070,089 B2
(45) Date of Patent: Jul. 20, 2021

(54) POWER RECEIVING APPARATUS, POWER TRANSMISSION SYSTEM, CHARGING APPARATUS AND POWER TRANSMISSION METHOD

(71) Applicant: SONY CORPORATION, Tokyo (JP)

(72) Inventor: Hiroyuki Mita, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/505,914

(22) Filed: Jul. 9, 2019

(65) Prior Publication Data

US 2019/0334383 A1    Oct. 31, 2019

Related U.S. Application Data

(63) Continuation of application No. 12/788,753, filed on May 27, 2010, now abandoned.

(30) Foreign Application Priority Data

Jul. 22, 2009    (JP) .................. 2009-170805

(51) Int. Cl.
*H02J 50/12* (2016.01)
*H02J 50/80* (2016.01)
(Continued)

(52) U.S. Cl.
CPC .............. *H02J 50/12* (2016.02); *H02J 7/025* (2013.01); *H02J 50/40* (2016.02); *H02J 50/50* (2016.02); *H02J 50/80* (2016.02); *H02J 50/10* (2016.02)

(58) Field of Classification Search
CPC ...................................................... H02J 50/12
(Continued)

(56) References Cited

U.S. PATENT DOCUMENTS 5,889,384 A    3/1999 Hayes et al.
6,028,413 A    2/2000 Brockmann
(Continued)

FOREIGN PATENT DOCUMENTS

BR    P10820443 A2    12/2011
BR    P10823526 A2    6/2015
(Continued)

OTHER PUBLICATIONS

Non-Final Office Action for U.S. Appl. No. 12/788,753, dated Oct. 9, 2018, 27 pages.
(Continued)

*Primary Examiner* — David V Henze-Gongola
*Assistant Examiner* — Tarikh Kanem Rankine
(74) *Attorney, Agent, or Firm* — Michael Best & Friedrich LLP

(57) ABSTRACT

A power receiving apparatus includes: a resonance element having a specific resonance frequency and adapted to couple in a non-contacting relationship to a different resonance element through a resonance relationship; a rectification section configured to rectify ac current of the resonance frequency in response to energy received by the resonance element; and a switching section configured to cut off a supplying path of the ac current from the resonance element to the rectification section; the resonance element maintaining the coupling state through the resonance relationship to the different resonance element also when the supplying path of the ac current to the rectification section is blocked by the switching section.

15 Claims, 10 Drawing Sheets

(51) Int. Cl.
*H02J 7/02* (2016.01)
*H02J 50/40* (2016.01)
*H02J 50/50* (2016.01)
*H02J 50/10* (2016.01)

(58) Field of Classification Search
USPC .......................................................... 320/108
See application file for complete search history.

(56) References Cited

U.S. PATENT DOCUMENTS

| | | | |
|---|---|---|---|
| 6,118,249 A * | 9/2000 | Brockmann | H02J 7/025 |
| | | | 320/108 |
| 6,301,128 B1 | 10/2001 | Jang et al. | |
| 6,553,263 B1 * | 4/2003 | Meadows | A61N 1/36071 |
| | | | 607/33 |
| 6,803,744 B1 | 10/2004 | Sabo | |
| 6,917,182 B2 * | 7/2005 | Burton | H02J 50/10 |
| | | | 320/108 |
| 7,960,944 B2 | 6/2011 | Hoffman et al. | |
| RE44,038 E | 3/2013 | Cho | |
| 8,487,481 B2 | 7/2013 | Cook et al. | |
| 2004/0145342 A1 * | 7/2004 | Lyon | H02J 50/90 |
| | | | 320/108 |
| 2005/0134213 A1 * | 6/2005 | Takagi | H02J 7/342 |
| | | | 320/108 |
| 2006/0061323 A1 | 3/2006 | Cheng et al. | |
| 2007/0103110 A1 | 5/2007 | Sagoo | |
| 2007/0211745 A1 | 9/2007 | Deshpande et al. | |
| 2007/0222542 A1 | 9/2007 | Joannopoulos et al. | |
| 2008/0067874 A1 | 3/2008 | Tseng | |
| 2008/0197713 A1 | 8/2008 | Jin | |
| 2008/0288025 A1 * | 11/2008 | Peterson | A61N 1/3787 |
| | | | 607/60 |
| 2009/0001931 A1 | 1/2009 | Lin | |
| 2009/0033280 A1 * | 2/2009 | Choi | H02J 7/025 |
| | | | 320/108 |
| 2009/0261778 A1 * | 10/2009 | Kook | H02J 50/10 |
| | | | 320/108 |
| 2009/0284245 A1 * | 11/2009 | Kirby | G06K 7/10178 |
| | | | 323/318 |
| 2009/0308933 A1 * | 12/2009 | Osada | H02J 50/10 |
| | | | 235/492 |
| 2009/0322281 A1 * | 12/2009 | Kamijo | H02J 50/10 |
| | | | 320/108 |
| 2010/0001845 A1 * | 1/2010 | Yamashita | H02J 7/025 |
| | | | 340/10.4 |
| 2010/0007307 A1 * | 1/2010 | Baarman | H02J 7/00034 |
| | | | 320/108 |
| 2010/0034238 A1 * | 2/2010 | Bennett | H02J 5/005 |
| | | | 375/130 |
| 2010/0066305 A1 * | 3/2010 | Takahashi | H01M 10/44 |
| | | | 320/108 |
| 2010/0201189 A1 * | 8/2010 | Kirby | H02J 50/60 |
| | | | 307/9.1 |
| 2010/0207575 A1 * | 8/2010 | Pijnenburg | H02J 50/10 |
| | | | 320/108 |
| 2010/0225271 A1 | 9/2010 | Oyobe et al. | |
| 2010/0259217 A1 | 10/2010 | Baarman et al. | |
| 2011/0121778 A1 | 5/2011 | Oyobe et al. | |
| 2011/0175569 A1 * | 7/2011 | Austin | B60L 53/305 |
| | | | 320/109 |
| 2012/0019057 A9 * | 1/2012 | Kirby | H02J 50/50 |
| | | | 307/9.1 |

| | | | |
|---|---|---|---|
| 2012/0032525 A1 | 2/2012 | Oyobe et al. | |
| 2015/0210170 A1 | 7/2015 | Oyobe et al. | |
| 2015/0251546 A1 | 9/2015 | Oyobe et al. | |

FOREIGN PATENT DOCUMENTS

| | | |
|---|---|---|
| CN | 1252902 A | 5/2000 |
| CN | 101375483 A | 2/2009 |
| CN | 101835653 A | 9/2010 |
| CN | 102848924 A | 1/2013 |
| CN | 102350953 A | 2/2021 |
| DE | 102008056927 A1 | 6/2009 |
| EE | 9000351 A | 2/2000 |
| EP | 0960459 A1 | 12/1999 |
| EP | 1780863 A2 | 5/2007 |
| EP | 1980008 A1 | 10/2008 |
| EP | 2196351 A1 | 6/2010 |
| EP | 2273650 A2 | 1/2011 |
| EP | 2415627 A2 | 2/2012 |
| EP | 3000643 A1 | 3/2016 |
| EP | 3415359 A1 | 12/2018 |
| JP | 4453743 B2 | 4/2010 |
| JP | 5111397 B2 | 1/2013 |
| KR | 20070078889 A | 8/2007 |
| RU | 2011119125 A | 11/2012 |
| TW | 382157 B | 2/2000 |
| WO | 9837610 A1 | 9/1998 |
| WO | 2007089086 A1 | 8/2007 |
| WO | 2009054221 A1 | 4/2009 |

OTHER PUBLICATIONS

Non-Final Office Action for US Patent Application No. 12/788,753, dated Jun. 1, 2017, 22 pages.
Non-Final Office Action for U.S. Appl. No. 12/788,753, dated Dec. 4, 2015, 42 pages.
Non-Final Office Action for U.S. Appl. No. 12/788,753, dated Apr. 9, 2015, 43 pages.
Non-Final Office Action for U.S. Appl. No. 12/788,753, dated Apr. 11, 2014, 37 pages.
Non-Final Office Action for U.S. Appl. No. 12/788,753, dated Jul. 5, 2012, 17 pages.
Final Office Action for U.S. Appl. No. 12/788,753, dated May 1, 2019, 33 pages.
Final Office Action for U.S. Appl. No. 12/788,753, dated Nov. 30, 2017, 25 pages.
Final Office Action for U.S. Appl. No. 12/788,753, dated Jul. 28, 2016, 41 pages.
Final Office Action for U.S. Appl. No. 12/788,753, dated Aug. 7, 2015, 44 pages.
Final Office Action for U.S. Appl. No. 12/788,753, dated Jul. 31, 2014, 40 pages.
Final Office Action for U.S. Appl. No. 12/788,753, dated Aug. 13, 2013, 26 pages.
Advisory Action for U.S. Appl. No. 12/788,753, dated Nov. 1, 2016, 03 pages.
Advisory Action for U.S. Appl. No. 12/788,753, dated Oct. 21, 2015, 03 pages.
Advisory Action for U.S. Appl. No. 12/788,753, dated Dec. 18, 2014, 03 pages.
European Office Communication pursuant to Article 94(3) EPC dated Sep. 17, 2019 for corresponding European Application No. 10006070.6.

* cited by examiner

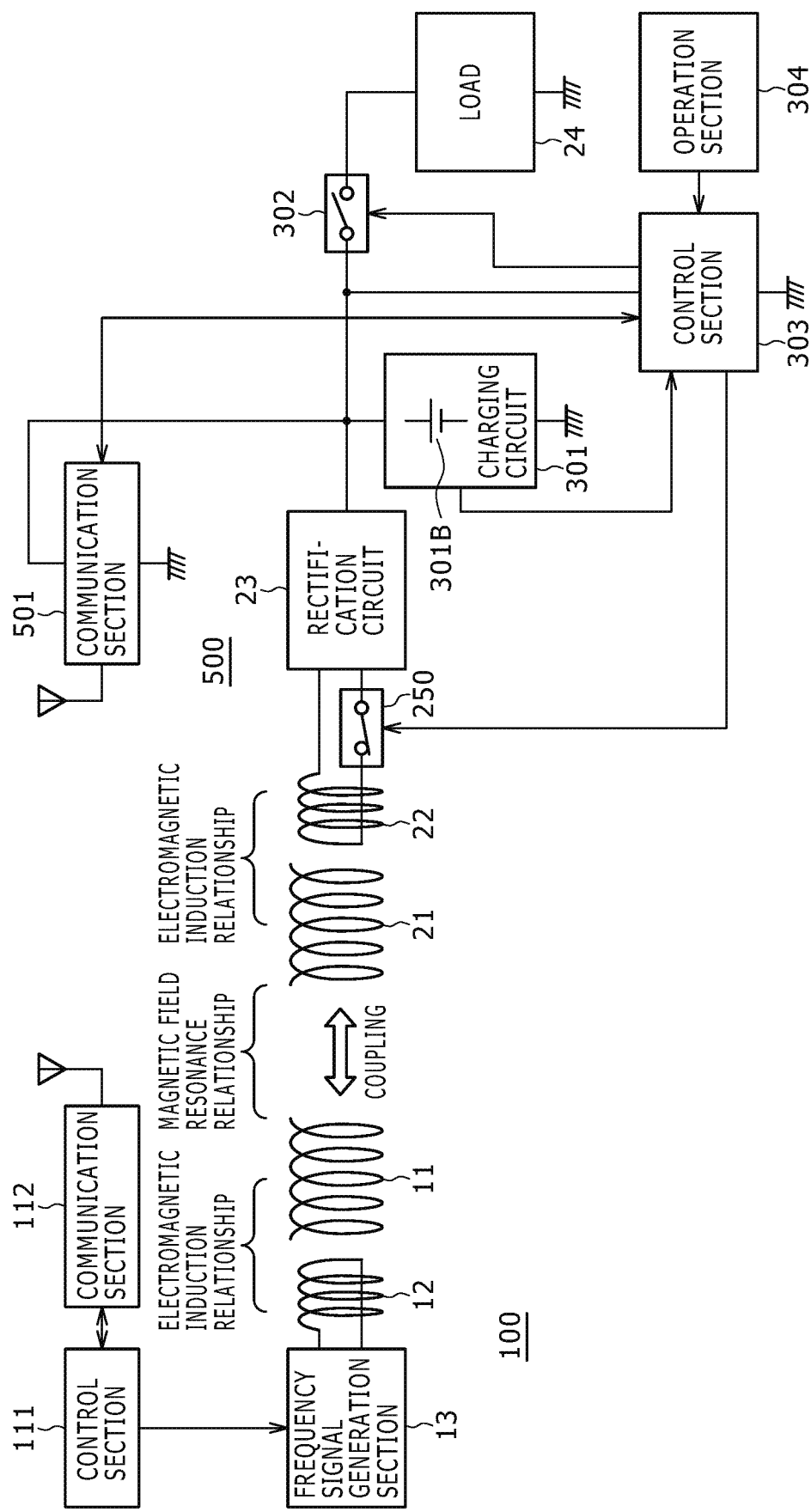

POWER RECEIVING APPARATUS, POWER TRANSMISSION SYSTEM, CHARGING APPARATUS AND POWER TRANSMISSION METHOD

CROSS REFERENCE TO RELATED APPLICATIONS

The present application is a continuation of U.S. patent application Ser. No. 12/788,753, filed on May 27, 2010, which claims the benefit of priority from Japanese Patent Application No. JP 2009-170805, filed in the Japan Patent Office on Jul. 22, 2009. Each of the above-referenced applications is hereby incorporated herein by reference in its entirety.

BACKGROUND OF THE INVENTION

1. Field of the Invention

This invention relates to an apparatus and a method for transmitting power by radio utilizing resonance of an electromagnetic field.

2. Description of the Related Art

As a technique for transmitting power by radio, a technique is well known which utilizes electromagnetic induction. In the power transmission which utilizes electromagnetic induction, current is supplied to one of two coils positioned closely to each other such that electromagnetic force is generated in the other coil by intermediation of magnetic fluxes generated from the one coil.

However, according to the power transmission which utilizes the electromagnetic induction, the two coils must be positioned closely to each other. Therefore, the power transmission has a problem that the distance over which the power can be transmitted is restricted. Further, if the axes of the coils upon electromagnetic induction coupling are brought out of alignment with each other, then the transmission efficiency is degraded. Therefore, the alignment upon coupling is significant.

In the meantime, a method wherein resonance of an electromagnetic field is utilized to transmit power has been proposed recently. According to the resonance type radio power transmission, power can be transmitted over such a distance as three to four meters and besides high power can be transmitted. Therefore, resonance type radio power transmission has an advantage that also a system which does not have a secondary cell, that is, a rechargeable battery, on the reception side can be constructed readily.

Further, the resonance type radio power transmission has little influence on any other electronic apparatus because energy is not transmitted if it has no resonating mechanism. Further, there is an advantage also in that, even if the alignment upon coupling is not very good, the transmission efficiency does not drop very much.

A power transmission system which uses a resonance phenomenon in a magnetic field is disclosed, for example, in U.S. Published Patent Application No. 2007/0222542 (hereinafter referred to as Patent Document 1).

An example of a configuration of the power transmission system which uses a magnetic field resonance phenomenon is shown in FIG. 9. FIG. 9 particularly shows an example of a system configuration where a power transmitting apparatus 10 of a supplying source of power and a power receiving apparatus 20 of a supplying destination or receiving side of power are provided in a one-by-one corresponding relationship to each other.

Referring to FIG. 9, the power transmitting apparatus 10 includes a resonance element 11, an excitation element 12 and a frequency signal generation section 13.

The resonance element 11 is formed, for example, from an air-core coil in the form of a loop coil. The excitation element 12 is formed, for example, from an air-core coil, which is connected at the opposite ends thereof to two output terminals of the frequency signal generation section 13. The resonance element 11 and the excitation element 12 are placed in a relationship wherein they are coupled strongly with each other by electromagnetic induction.

The air-core coil which forms the resonance element 11 has not only inductance but also coil internal capacitance and has a self resonance frequency which depends upon the inductance and the capacitance.

The frequency signal generation section 13 generates a frequency signal of a frequency equal to the self resonance frequency of the resonance element 11. The frequency signal generation section 13 may be formed from a Colpitts type oscillation circuit, a Hartley type oscillation circuit or the like.

Though not shown, the power transmitting apparatus 10 receives supply of power from an ac power supply so that a frequency signal is generated from the frequency signal generation section 13.

Meanwhile, the power receiving apparatus 20 include a resonance element 21, an excitation element 22, a rectification circuit 23 and a load 24.

The resonance element 21 is formed, for example, from an air-core coil in the form of a loop coil similarly to the resonance element 11. The excitation element 22 is formed, for example, from an air-core coil, which is connected at the opposite ends thereof to two input terminals of the rectification circuit 23. The resonance element 21 and the excitation element 22 are configured so as to have a relationship wherein they are coupled strongly to each other by electromagnetic induction.

The air-core coil which forms the resonance element 21 has not only inductance but also coil internal capacitance and has a self resonance frequency which depends upon the inductance and the capacitance similarly as in the resonance element 11.

The self resonance frequencies of the resonance element 11 and the resonance element 21 are equal to each other and a frequency fo.

In such a system configuration as described above, the frequency signal generation section 13 in the power transmitting apparatus 10 supplies a frequency signal equal to the self resonance frequency fo of the resonance elements 11 and 21 to the excitation element 12.

Accordingly, ac current of the frequency fo flows to the air-core coil of the excitation element 12, and induction current of the same frequency fo is induced in the resonance element 11 formed similarly from an air-core coil by electromagnetic induction.

In the circuit configuration of FIG. 9, the self resonance frequency of the air-core coil which forms the resonance element 21 of the power receiving apparatus 20 is the frequency fo and coincides with the self resonance frequency of the resonance element 11 of the power transmitting apparatus 10. Accordingly, the resonance element 11 of the power transmitting apparatus 10 and the resonance element 21 of the power receiving apparatus 20 have a magnetic field resonance relationship and exhibit a maximum coupling amount and minimum loss at the frequency fo.

Since the resonance element 11 of the power transmitting apparatus 10 and the resonance element 21 of the power receiving apparatus 20 in the present circuit configuration have a magnetic field resonance relationship as described above, ac current is supplied in a contactless fashion from the resonance element 11 to the resonance element 21 at the resonance frequency fo.

In the power receiving apparatus 20, induction current is induced in the excitation element 22 by electromagnetic induction by ac current appearing in the resonance element 21. The induction current induced in the excitation element 22 is rectified into dc current by the rectification circuit 23 and supplied as power supply current to the load 24.

In this manner, a magnetic field resonance phenomenon is utilized to transmit power by radio from the power transmitting apparatus 10 to the power receiving apparatus 20.

A relationship between the frequency of the frequency signal from the frequency signal generation section 13 in the power transmission system of the configuration shown in FIG. 9 and the coupling amount in magnetic field resonance is illustrated in FIG. 10. As can be seen apparently from FIG. 10, the power transmission system of the configuration of FIG. 9 indicates frequency selectivity wherein a maximum coupling amount is obtained at the resonance frequency fo.

FIG. 11 illustrates a relationship between the distance D between the resonance element 11 of the power transmitting apparatus 10 and the resonance element 21 of the power receiving apparatus 20 and the coupling amount in magnetic field resonance. From FIG. 11, it can be recognized that, although the coupling amount increases as the distance decreases, where the distance is very short, the coupling amount is rather low. Thus, it can be recognized that a certain distance exists at which the coupling amount is maximum at a certain resonance frequency.

FIG. 12 illustrates a relationship between the resonance frequency and the distance between resonance elements at which a maximum coupling amount is obtained. From FIG. 12, it can be seen that a maximum coupling amount is obtained if, where the resonance frequency is low, the distance between the resonance elements is increased, but where the resonance frequency is high, the distance between the resonance elements is decreased.

SUMMARY OF THE INVENTION

As described above, in the power transmission system of the resonance type, even if the distance between the power transmitting apparatus and the power receiving apparatus is comparatively great or even if the coupling axes are somewhat out of alignment with each other, power transmission can be carried out.

Therefore, it is possible to transmit power from a single power transmitting apparatus 10 of a power supplying source to a plurality of power supplying destinations as seen in FIG. 13, which illustrates that power is transmitted to two power receiving apparatus 20A and 20B as power supplying designations. It is to be noted that the power receiving apparatus 20A and 20B have a configuration quite same as that of the power receiving apparatus 20 described hereinabove and include like components which are indicated by like reference symbols with suffixes A and B added thereto, respectively.

It is assumed here that the self resonance frequency of the resonance element 11 of the power transmitting apparatus 10 and the self resonance frequency of resonance elements 21A and 21B of the two power receiving apparatus 20A and 20B are equal to each other.

Since the coupling amount between a power supplying source and a power supplying destination increases as the distance between the resonance elements decreases, in the example shown in FIG. 13, the power receiving apparatus 20B has a coupling amount greater than that of the power receiving apparatus 20A to the power transmitting apparatus 10.

Since power to be supplied from the power supplying source to the power supplying destination increases as the distance between the resonance elements increases, the power supplied from the power transmitting apparatus 10 is relatively higher to the power receiving apparatus 20B than to the power receiving apparatus 20A.

Incidentally, apart from a case wherein it is necessary to render operative both of the power receiving apparatus 20A and the power receiving apparatus 20B and supply of dc current to loads is demanded, a case wherein there is no necessity to render one of the two apparatus operative matters.

In particular, each of the power receiving apparatus described above is configured such that it normally receives power transmitted thereto by radio. Therefore, even where any of the power receiving apparatus does not demand reception of power, if the power receiving apparatus is positioned such that it can receive supply of power from the power transmitting apparatus 10, then power is supplied to the power receiving apparatus uselessly and rectified by the rectification circuit 23 and then consumed.

Thus, if a plurality of power receiving apparatus have a magnetic field resonance relationship with the power transmitting apparatus 10 as seen in FIG. 13, then electric energy from the power transmitting apparatus 10 is distributed and transmitted to the plural power receiving apparatus. Therefore, the power received by each of the power receiving apparatus decreases in response to the number of such power receiving apparatus, resulting in a problem that the power receiving apparatus which demands reception of power cannot receive sufficient power from the power transmitting apparatus.

Particularly if the power receiving apparatus 20B positioned nearer to the power transmitting apparatus 10 in FIG. 13 need not operate and does not demand reception of power, the power to be supplied to the power receiving apparatus 20A which demands reception of power decreases in a distribution relationship, which is not efficient.

Therefore, it is desirable to provide an apparatus and a method which can eliminate such a problem as described above.

According to the present embodiment, there is provided a power receiving apparatus including a resonance element having a specific resonance frequency and adapted to couple in a non-contacting relationship to a different resonance element through a resonance relationship, rectification means for rectifying ac current of the resonance frequency in response to energy received by the resonance element, and switching means for cutting off a supplying path of the ac current from the resonance element to the rectification means, the resonance element maintaining the coupling state through the resonance relationship to the different resonance element also when the supplying path of the ac current to the rectification means is blocked by the switching means.

It is assumed that the power receiving apparatus is positioned such that it couples to the power transmitting apparatus through a resonance relationship and couples also to a different power receiving apparatus through a resonance relationship. In this instance, the resonance element of the power receiving apparatus couples to both of the resonance element provided in the power transmitting apparatus and the resonance element of the different power receiving apparatus through a resonance relationship.

When the power receiving apparatus having the configuration described above need not receive supply of power, the supplying path of ac current from the resonance element to the rectification means is cut off by the switching means.

However, at this time, the resonance element of the power receiving apparatus is kept in the state wherein it couples to the different resonance element through a resonance relationship. Accordingly, in the power receiving apparatus, the power which the resonance element receives from the power transmitting apparatus is transferred to the resonance element of the difference power receiving apparatus which is kept coupled to the resonance element through a resonance relationship while supply of current to the rectification means is cut off by the switching means.

Thus, the resonance element of the power receiving apparatus in which the supplying path of ac current from the resonance element to the rectification means is cut off plays a role of repeating means for repeating power from the power transmitting apparatus to the different power receiving apparatus.

In this instance, the different power receiving apparatus receives supply of power transmitted through the coupling through a direct resonance relationship with the power transmitting apparatus and besides receives reception of power through the coupling through a resonance relationship with the power receiving apparatus. Consequently, the power supply amount to the different power receiving apparatus increases.

Consequently, with the power receiving apparatus, power transmitted thereto through the coupling through a resonance relationship from the power transmitting apparatus can be repeated so as to be transmitted to the different power receiving apparatus without consuming the power wastefully.

BRIEF DESCRIPTION OF THE DRAWINGS

FIG. 6 is a diagrammatic view showing an example of a configuration of a charging system as a power transmission system according to a still further embodiment of the present invention;

DETAILED DESCRIPTION OF THE PREFERRED EMBODIMENTS

In the following, power receiving apparatus and power transmission systems including the power receiving apparatus according to preferred embodiments of the present invention are described with reference to the accompanying drawings.

Power Receiving Apparatus According to the First Embodiment

Figure 1:
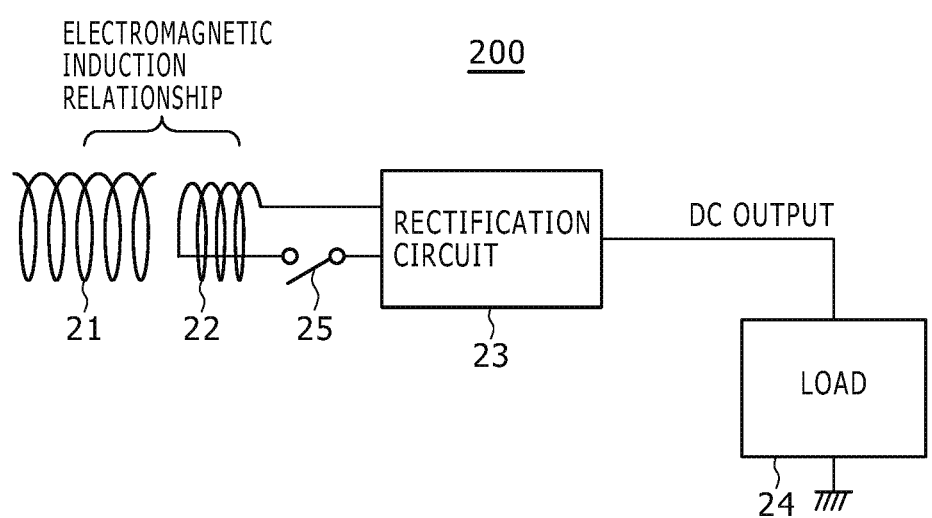
FIG. 1 is a diagrammatic view showing an example of a configuration of a power receiving apparatus according to an embodiment of the present invention.
Figure 9:
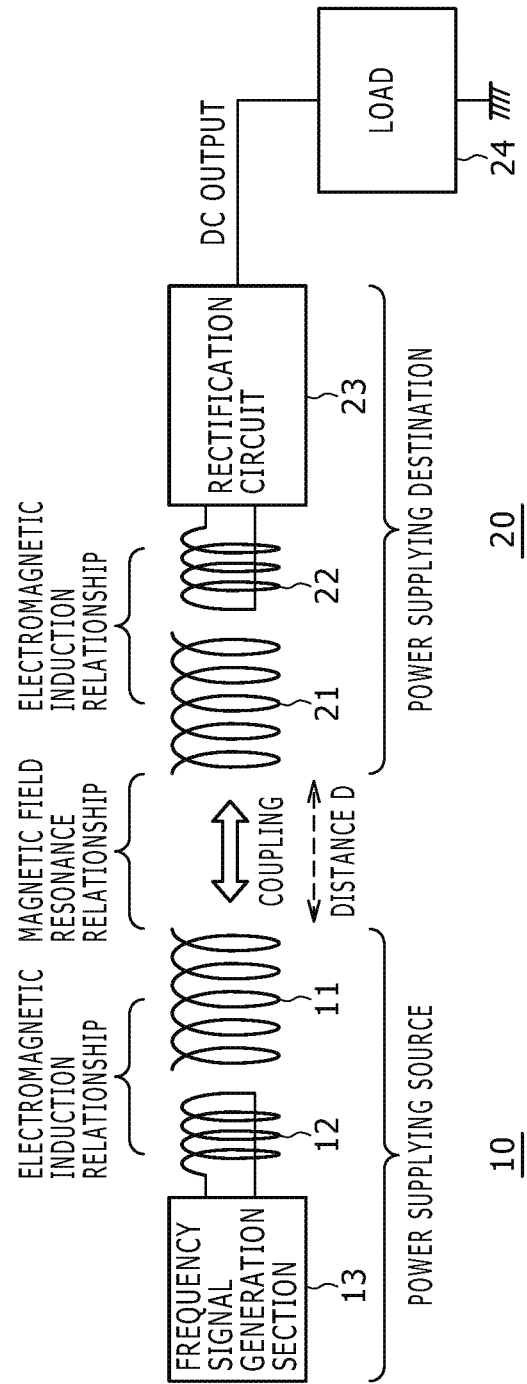
FIG. 9 is a diagrammatic view showing an example of a configuration of a power transmission system of the magnetic field resonance type.
Figure 10:
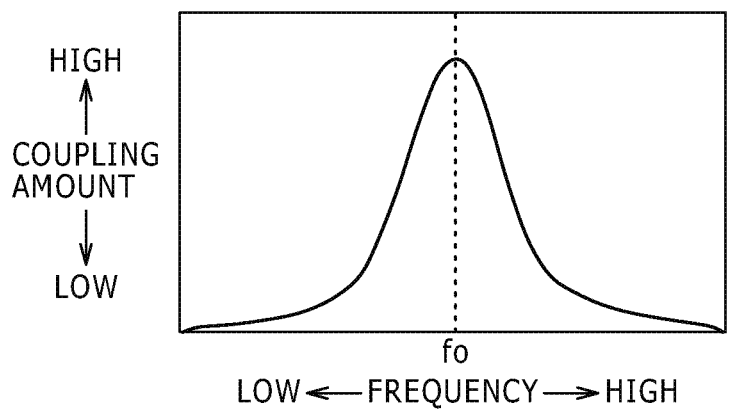
FIGS. 10, 11 and 12 are diagrams illustrating characteristics of the power transmission system of the magnetic field resonance type shown in FIG. 9.
Figure 11:
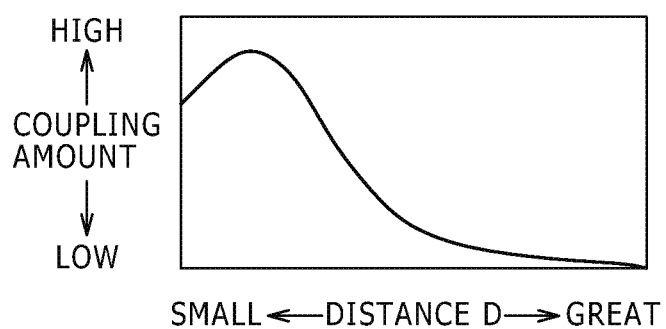
Figure 12:
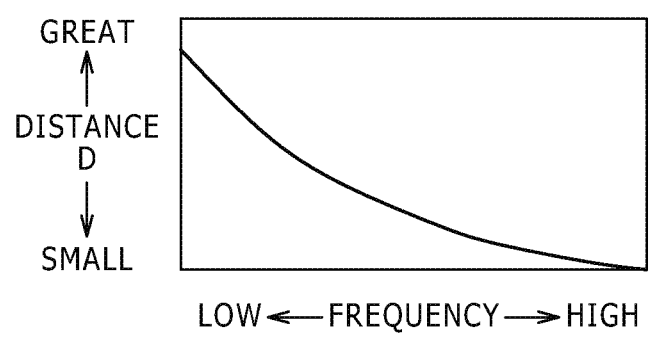

FIG. 1 shows an example of a configuration of a power receiving apparatus according to a first embodiment of the present invention. Those parts shown in FIG. 1 which are identical to those parts of the power receiving apparatus in the power transmission system shown in FIG. 9 are denoted by identical reference symbols.

Referring to FIG. 1, the power receiving apparatus 200 according to the first embodiment includes a resonance element 21, an excitation element 22, a rectification circuit 23, a load 24, and a power supply controlling switch 25 provided on a current path between the excitation element 22 and the rectification circuit 23.

The resonance element 21 is formed, for example, from an air-core coil in the form of a loop coil similarly to the resonance element 11.

The excitation element 22 is formed, for example, from an air-core coil, which is connected at a terminal thereof to one of input terminals of the rectification circuit 23. The excitation element 22 is connected at the other terminal of the air-core coil thereof to the other one of the input terminals of the rectification circuit 23 through the power supply controlling switch 25.

The resonance element 21 and the excitation element 22 are configured so as to have a relationship in which they are coupled strongly to each other by electromagnetic induction.

The air-core coil of the resonance element 21 has not only inductance but also coil internal capacitance and has a frequency fo which depends upon the inductance and the capacitance. As described hereinabove, the frequency fo of the resonance element 11 is equal to the self resonance frequency of the resonance element 11 of the power transmitting apparatus 10.

The power supply controlling switch 25 may be formed from a mechanical switch which is manually operated by a user or a relay switch or a semiconductor switch which switches on and off in response to a predetermined operation by a user.

When the power supply controlling switch 25 is in an on or closed state, the resonance element 21 in the power receiving apparatus 200 is coupled to the resonance element 11 of the power transmitting apparatus 10 through a magnetic field resonance relationship therebetween, and similar operation to that described above is carried out. In particular, induction current is induced in the excitation element 22 by electromagnetic induction by ac current appearing in the resonance element 21. The induction current induced in the excitation element 22 is rectified into dc current by the rectification circuit 23 and then supplied as power supply current to the load 24.

On the other hand, when the power supply controlling switch 25 is in an off or open state, no current flows through the excitation element 22. Accordingly, even if the resonance element 11 of the power transmitting apparatus 10 and the resonance element 21 of the power receiving apparatus 200 are coupled to each other through the magnetic field resonance relationship therebetween and ac current flows through the resonance element 21, no induction current flows through the excitation element 22.

In other words, when the power supply controlling switch 25 is off, supply of ac current from the resonance element 21 to the rectification circuit 23 is blocked.

Accordingly, when the power supply controlling switch 25 is off, no dc current is supplied to the load 24 in the power receiving apparatus 200, and no power is consumed in the power receiving apparatus 200.

However, the resonance element 21 of the power receiving apparatus 200 in which the power supply controlling switch 25 is off in this manner can be coupled to the resonance element of a different power receiving apparatus through a magnetic field resonance relationship. Then, if such a different power receiving apparatus as just mentioned exists, then ac magnetic field energy transmitted to the resonance element 21 of the power receiving apparatus 200 in which the power supply controlling switch 25 is off is sent to the resonance element of the different power receiving apparatus.

In other words, the resonance element 21 of the power receiving apparatus 200 in which the power supply controlling switch 25 is off acts as a repeater which transmits ac magnetic field energy supplied thereto from the power transmitting apparatus 10 to the resonance element of the different power receiving apparatus.

Figure 2:
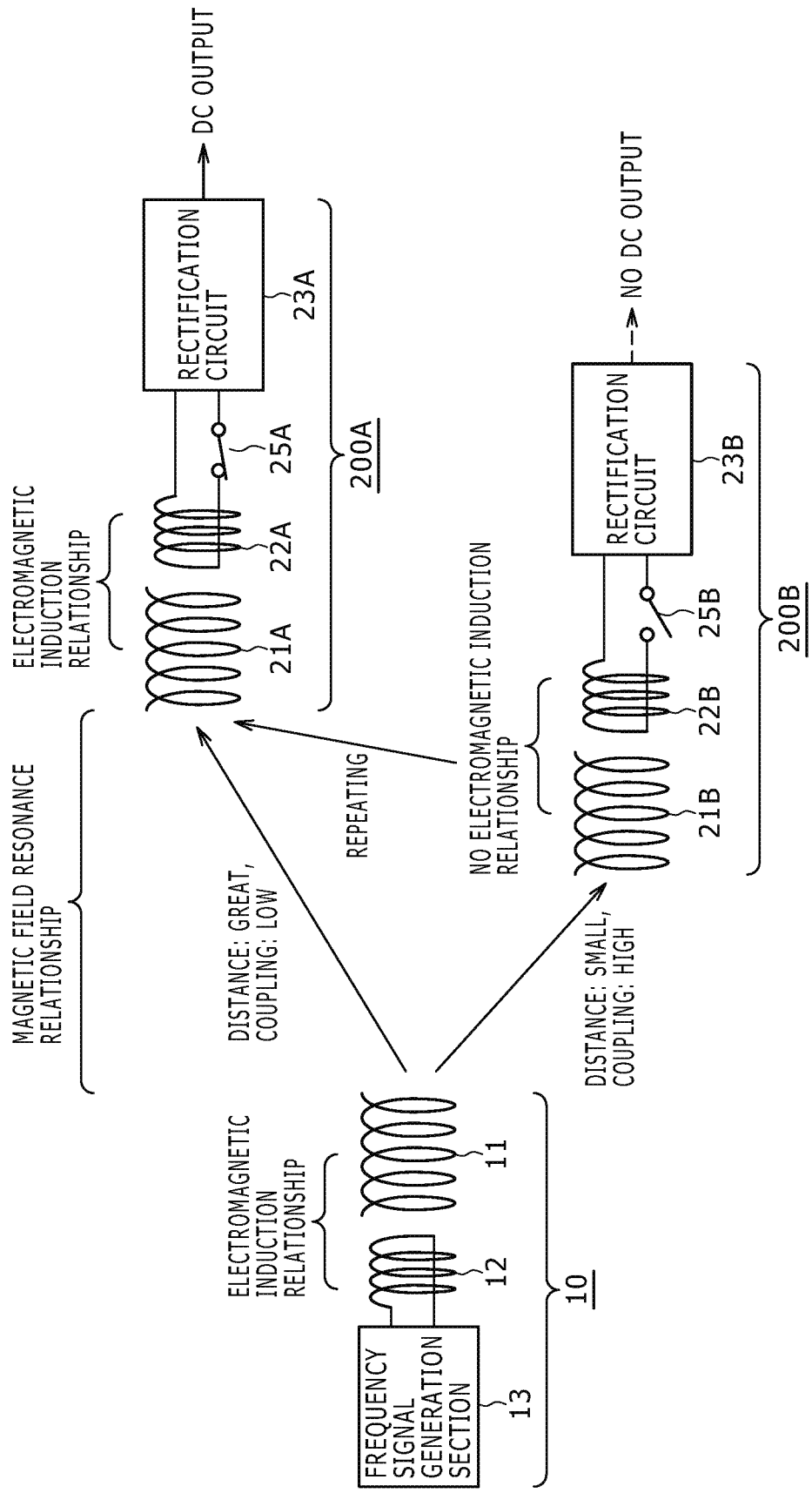
FIG. 2 is a diagrammatic view showing an example of a power transmission system which includes the power receiving apparatus of FIG. 1.

The state wherein the resonance element 21 acts as a repeater is described more particularly with reference to FIG. 2 which shows a power transmission system according to an embodiment of the present invention.

Referring to FIG. 2, in the power transmission system shown, while power is supplied from the power transmitting apparatus 10 of a power supplying source to a certain power receiving apparatus 200A, there exists a different power receiving apparatus 200B which can be coupled to the power transmitting apparatus 10 through a magnetic field resonance relationship.

In the power transmission system of FIG. 2, the power receiving apparatus 200A and 200B have a configuration quite similar to that of the power receiving apparatus 200 described hereinabove and includes like components to those of the power receiving apparatus 200. Such like components are denoted by like reference symbols with the suffixes A and B added thereto, respectively.

In the power transmission system of FIG. 2, it is shown that the power receiving apparatus 200B which need not receive supply of power is positioned nearer to the power transmitting apparatus 10 which serves as a power supplying source than the power receiving apparatus 200A to which power is to be supplied and therefore has a coupling amount to the power transmitting apparatus 10 greater than that of the power receiving apparatus 200A.

Further, in the power transmission system of FIG. 2, the power receiving apparatus 200A and the power receiving apparatus 200B have such a positional relationship to each other that they are coupled to each other through a magnetic field resonance relationship.

Further, in the power transmission system shown in FIG. 2, the power supply controlling switch 25A of the power receiving apparatus 200A is in an on or closed state in order that the power receiving apparatus 200A may receive supply of power from the power transmitting apparatus 10 of a power supply source. Meanwhile, since the power receiving apparatus 200B need not receive supply of power from the power transmitting apparatus 10, the power supply controlling switch 25 is in an off or open state.

Accordingly, between the power transmitting apparatus 10 and the power receiving apparatus 200A, the resonance elements 11 and 21A are coupled to each other through a magnetic field resonance relationship, and since the power supply controlling switch 25A is on, induction current flows through the excitation element 22A. The induction current induced in the excitation element 22A is rectified into dc current by the rectification circuit 23A and supplied as power supply current to the load 24 not shown in FIG. 2.

In the meantime, between the power transmitting apparatus 10 and the power receiving apparatus 200B, the resonance elements 11 and 21B are coupled to each other through a magnetic field resonance relationship. Consequently, ac magnetic field energy from the power transmitting apparatus 10 is transmitted to the resonance element 21B of the power receiving apparatus 200B. However, in the power receiving apparatus 200B, since the power supply controlling switch is in an off or open state, no induction current flows to the excitation element 22B, and no current is supplied to the rectification circuit 23B and no power is consumed.

Here, the power receiving apparatus 200A and the power receiving apparatus 200B have such a positional relationship that they are coupled to each other through a magnetic field resonance relationship. Accordingly, ac magnetic field energy transmitted from the power transmitting apparatus 10 to the resonance element 21B of the power receiving apparatus 200B is sent to the resonance element 21A of the power receiving apparatus 200A.

In other words, in the power transmission system of FIG. 2, part of the ac magnetic field energy sent out from the power transmitting apparatus 10 is sent to the resonance element 21A of the power receiving apparatus 200A through the resonance element 21B of the power receiving apparatus 200B.

Figure 13:
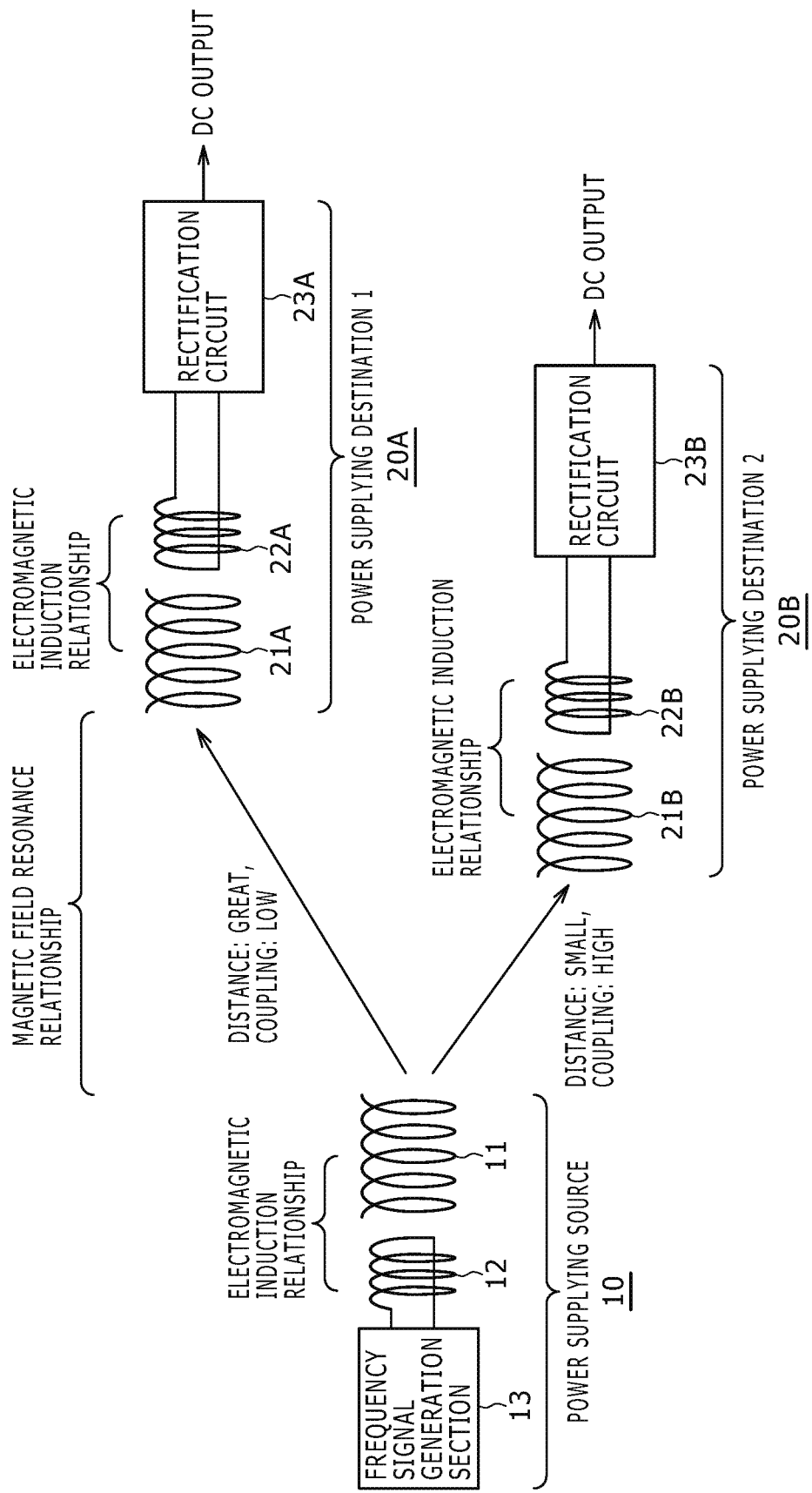
FIG. 13 is a diagrammatic view illustrating a problem of an existing power transmission system of the magnetic field resonance type shown in FIG. 9.

In the power transmission system of FIG. 13, ac magnetic field energy sent from the power transmitting apparatus 10 to the power receiving apparatus 20B is consumed in the power receiving apparatus 20B. However, in the power transmission system of FIG. 2, such ac magnetic field energy is not consumed but is sent to the power receiving apparatus 200A through the power receiving apparatus 200B.

In this manner, the power receiving apparatus 200A receives supply of power from the power transmitting apparatus 10 through coupling by a direct magnetic field resonance relationship and further receives supply of power through the power receiving apparatus 200B. Accordingly, in the power transmission system of FIG. 2, the power receiving apparatus 200A can receive all of the ac magnetic field energy sent out from the power transmitting apparatus 10. Consequently, the power receiving apparatus 200A can receive supply of power efficiently.

It is to be noted that, since the power supply controlling switch 25A in the power receiving apparatus 200A which is to receive supply of power from the power transmitting apparatus 10 is in an on state as can be seen from FIG. 2, the power receiving apparatus 200A may have the configuration of the power receiving apparatus 20 shown in FIG. 9 which does not include the power supply controlling switch 25. In particular, in the power transmission system of FIG. 2, all of the power receiving apparatus may not include the configuration of the power receiving apparatus 200 of the present embodiment.

It is to be noted that, while, in the first embodiment described above, the power supply controlling switch 25 is a mechanical switch or a relay switch, the power supply controlling switch 25 may otherwise have a configuration of a semiconductor switch. In this instance, a controlling section formed, for example, from a microcomputer for receiving an operation input of a user is provided such that it controls the power supply controlling switch 25 to switch in response to an operation input of the user indicative of whether or not the power receiving apparatus should be rendered operative. In particular, if the user inputs an instruction operation for rendering the power receiving apparatus operative, then the control section controls the power supply controlling switch to an on state, but if the user inputs another instruction operation for rendering the power receiving apparatus inoperative, then the control section controls power supply controlling switch to an off state.

Power Receiving Apparatus of the Second Embodiment

In the power receiving apparatus 200 of the first embodiment, the power supply controlling switch is controlled to switch only in response to an operation of the user. In contrast, in the power receiving apparatus of the second embodiment, the power supply controlling switch is automatically controlled to switch.

Figure 3:
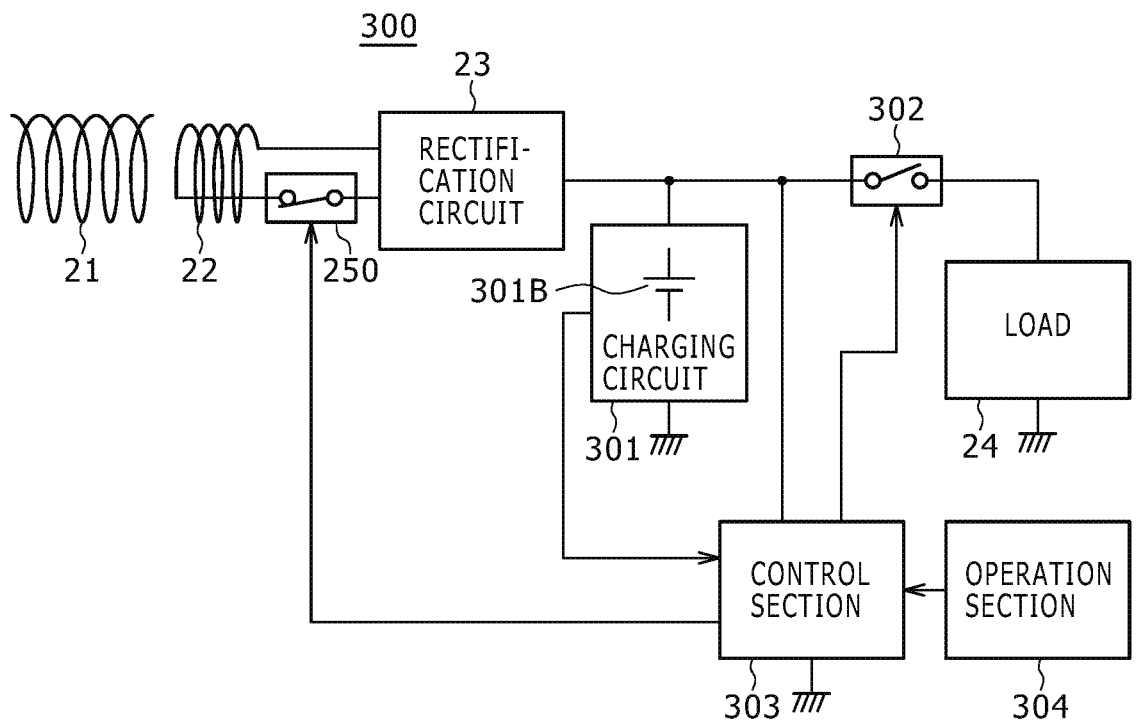
FIG. 3 is a diagrammatic view showing an example of a configuration of a power receiving apparatus according to another embodiment of the present invention.

FIG. 3 shows an example of a configuration of the power receiving apparatus 300 of the second embodiment. The power receiving apparatus 300 includes several common components to those of the power receiving apparatus 200 of the first embodiment, and overlapping description of the common components of the power receiving apparatus 200 is omitted herein to avoid redundancy.

Referring to FIG. 3, the power receiving apparatus 300 shown includes a battery 301B of the rechargeable type and further includes a charging circuit 301 for charging the rechargeable battery 301B, a power supply switch 302, a control section 303 and an operation section 304.

The power receiving apparatus 300 further includes a power supply controlling switch circuit 250 in place of the power supply controlling switch 25. The power supply controlling switch circuit 250 is formed, for example, from a semiconductor switching element.

In the present second embodiment, the power receiving apparatus 300 receives radio power transmitted from the power transmitting apparatus 10 and uses the radio power to charge the battery 301B and then supplies power supply current to a load.

The charging circuit 301 charges the battery 301B with dc current from the rectification circuit 23 when the power supply controlling switch circuit 250 is on. In the power receiving apparatus 300, the charging circuit 301 has a function of detecting that the battery 301B is charged up and notifying the control section 303 of such charge up.

The power supply switch 302 is interposed between an output terminal of the rectification circuit 23 and the load 24 and controlled between on and off in accordance with a switching signal from the control section 303. Also this power supply switch 302 is formed, for example, from a semiconductor switching element.

When the power supply controlling switch circuit 250 is on and the power supply switch 302 is on, the power receiving apparatus 300 receives radio power transmitted from the power transmitting apparatus 10, and while the battery 301B is charged by the charging circuit 301, the power receiving apparatus 300 supplies power also to the load 24.

The control section 303 includes, for example, a microcomputer, and power is normally supplied from the battery 301B to the control section 303.

The operation section 304 includes a power supply key and is connected to the control section 303. If the operation section 304 receives an operation input information of the power supply key, then it decides whether the operation input information represents an operation to switch on the power supply or another operation to switch off the power supply. Then, the control section 303 controls the power supply switch 302 to an on state or an off state in response to a result of the decision.

On the other hand, if the control section 303 receives a notification from the charging circuit 301 that the charging circuit 301B is charged up, then it switches off the power supply controlling switch circuit 250. Accordingly, at this time, the power receiving apparatus 300 does not consume ac magnetic field energy sent thereto from the power transmitting apparatus 10, and the resonance element 21 acts as a repeater of the ac magnetic field energy as described hereinabove.

If the battery 301B is not charged up, then the control section 303 controls the power supply controlling switch circuit 250 to an on state, and the power receiving apparatus 300 converts ac magnetic field energy sent thereto from the power transmitting apparatus 10 into dc current by means of the rectification circuit thereof and then consumes the dc current.

Figure 4:
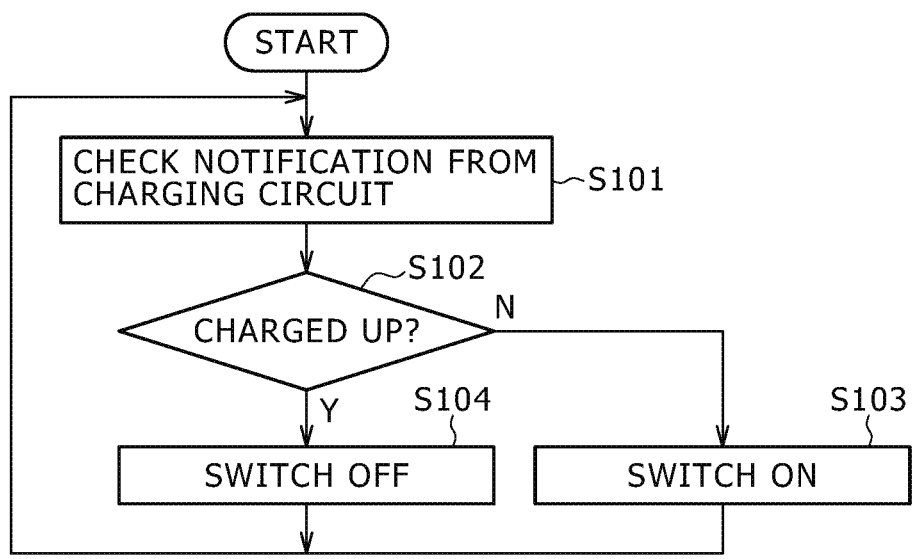
FIG. 4 is a flow chart illustrating processing operation of the power receiving apparatus of FIG. 3.

FIG. 4 illustrates processing operation by the control section 303 for controlling the power supply controlling switch circuit 250 between on and off.

The control section 303 first checks a notification of charge up from the charging circuit 301 at step S101. Then at step S102, the control section 303 decides whether or not the battery 301B is in a charged up state at step S102. If it is decided that the battery 301B is not in a charged up state, then the control section 303 controls the power supply controlling switch circuit 250 to be kept on at step S103. Thereafter, the processing returns to step S101.

On the other hand, if it is decided at step S102 that the battery 301B is in a charged up state, then the control section 303 controls the power supply controlling switch circuit 250 to change over to an off state at step S104. Thereafter, the processing returns to step S101.

In the power receiving apparatus 300 of the present second embodiment, when the battery 301B is in a charged up state, it need not receive supply of power from the power transmitting apparatus 10, and consequently, the power supply controlling switch circuit 250 is switched off automatically.

Accordingly, with the power receiving apparatus 300 of the present second embodiment, different from the power receiving apparatus 200 of the first embodiment, even if the user does not manually carry out a switching operation of the power supply controlling switch, it is possible to prevent unnecessary consumption of ac magnetic field energy and achieve efficient radio power transmission.

Further, where all of a plurality of power receiving apparatus which receive ac magnetic field energy from the power transmitting apparatus 10 have the configuration of the power receiving apparatus 300 of the second embodiment, the time before all of the plural power receiving apparatus are placed into a fully charged stage can be reduced. In particular, where all of the batteries of the plural power receiving apparatus 300 are not in a charged up state, ac magnetic field energy from the power transmitting apparatus 10 is distributed to the plural power receiving apparatus 300 to carry out charging. However, in a power reception state wherein the batteries are in a charged up state, the power supply controlling switch circuit 250 is off and acts as a repeater for the ac magnetic field energy. Therefore, the ac magnetic field energy to be transmitted to a power receiving apparatus which has a battery which is not in a charged up state as yet increases.

Consequently, since ac magnetic field energy from the power transmitting apparatus 10 can be transmitted efficiently until all of a plurality of power receiving apparatus are placed into a charged up state, the time before all of the plural power receiving apparatus are placed into a charged up state can be reduced.

Third Embodiment: Power Transmission System (Charging System)

Figure 5A:
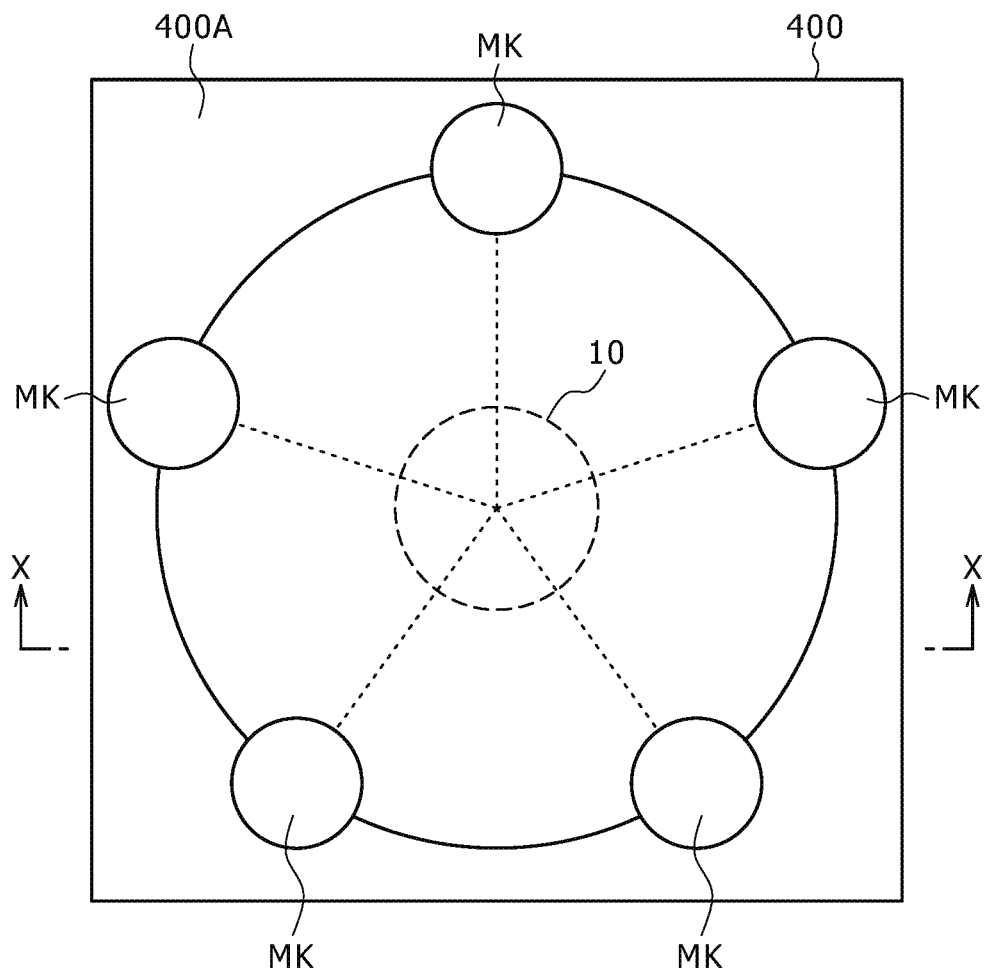
FIGS. 5A and 5B are a diagrammatic view and a cross sectional view, respectively, showing an example of a charging system as a power transmission system according to a further embodiment of the present invention.
Figure 5B:
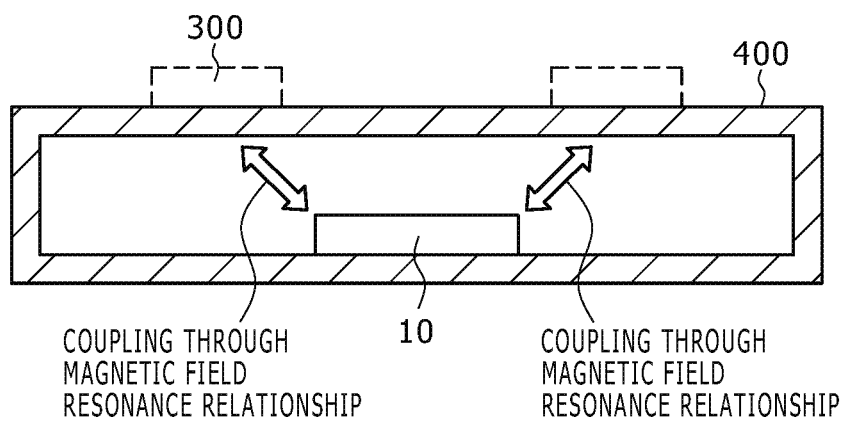

In the present third embodiment, the present invention is embodied as a charging system or charging apparatus for charging the power receiving apparatus 300 of the second embodiment. FIGS. 5A and 5B show appearance of the charging system as a power transmission system of the present third embodiment.

In the charging system of the present embodiment, a power transmitting apparatus 10 is provided in the inside of a box-shaped charging cradle, and a plurality of power receiving apparatus 300 are placed on the charging cradle.

FIG. 5A shows a top plan of a charging cradle 400 which forms the charging system of the present embodiment, and FIG. 5B shows a cross section taken along line X-X.

The charging cradle 400 is formed in a flattened box shape made of a non-magnetic material. In the inside of the charging cradle 400, the power transmitting apparatus 10 serving as a power supplying source is disposed at a central position of the charging cradle 400. A broken line shown in FIG. 5A indicates an air-core coil which forms the resonance element 11 of the power transmitting apparatus 10.

On a receiving face 400A of the charging cradle 400 which receives a plurality of power receiving apparatus 300, a plurality of marks MK each indicative of a position at which a power receiving apparatus 300 is to be placed, in the example of FIG. 5A, a plurality of circular marks, are provided, for example, by printing.

As seen in FIGS. 5A and 5B, the marks MK are provided such that the centers thereof are positioned on a circle at an equal distance from the position of the center of the charging cradle 400 at which the power transmitting apparatus 10 is disposed. This is because it is intended to make all of the coupling amounts through a magnetic field resonance relationship between the plural power receiving apparatus 300 placed on the charging cradle 400 and the power transmitting apparatus 10 equal to each other.

In particular, in the present charging cradle 400, if a power receiving apparatus 300 is placed at one of the plural marks MK, then on whichever one of the plural marks MK the power receiving apparatus 300 is placed, the power receiving apparatus 300 can receive ac magnetic field energy of an equal magnitude from the power transmitting apparatus 10.

Further, if a plurality of power receiving apparatus 300 are placed on the charging cradle 400, then ac magnetic field energy is first distributed and supplied equally to all of the power receiving apparatus 300 from the power transmitting apparatus 10.

Then, if the battery 301B of any of the power receiving apparatus 300 is placed into a charged up state, then the resonance element of the power receiving apparatus 300 now acts as a repeater of the ac magnetic field energy as described hereinabove. Accordingly, to any other power receiving apparatus 300 whose battery 301B is not in a charged up state, ac magnetic field energy is additionally transmitted through the repeater in addition to the ac magnetic field energy originally supplied thereto from the power transmitting apparatus 10.

In particular, the power receiving apparatus 300 whose battery 301B is fully charged does not consume the ac magnetic field energy being received till then but repeats the ac magnetic field energy to the other power receiving apparatus 300 whose battery 301B is not in a charged up state. Accordingly, the ac magnetic field energy to be applied to the other power receiving apparatus 300 whose battery 301B is not in a fully charged state increases from that till then.

Therefore, with the charging system of the present embodiment, it can charge a plurality of power receiving apparatus efficiently.

Fourth Embodiment: Power Transmission System or Charging System

Also in the present fourth embodiment, the present invention is applied to a charging system as an example of a power transmission system similarly to the third embodiment.

Although the charging system of the present fourth embodiment has a basic configuration which includes a charging cradle similar to that in the third embodiment, it is different from the third configuration in that each of a power transmitting apparatus of a supplying source of charging power and a power receiving apparatus for receiving the charging power include a communication section.

In the present fourth embodiment, each power receiving apparatus sends a residual charging amount of a battery to the power transmitting apparatus.

The power transmitting apparatus produces a charging schedule plan in response to the received residual charging amounts of the plural power receiving apparatus and sends a controlling instruction for placing the power supply controlling switch circuit into an on state or an off state to each of the plural power receiving apparatus in accordance with the charging schedule plan.

Each of the power receiving apparatus executes an operation to place the power supply controlling switch circuit thereof into an on or off state in response to the controlling instruction from the power transmitting apparatus.

Consequently, in the charging system of the present fourth embodiment, the plural power receiving apparatus can be charged up rapidly in appropriate charging time.

FIG. 6 shows an example of a configuration of the power transmitting apparatus 100 and the power receiving apparatus 500 which form the charging system of the present fourth embodiment. Those parts shown in FIG. 6 which are identical to those shown in abovementioned embodiments are denoted by identical reference symbols.

Referring to FIG. 6, the power transmitting apparatus 100 includes a control section 111 and a communication section 112 in addition to a resonance element 11, an excitation element 12 and a frequency signal generation section 13.

The control section 111 is configured including, for example, a microcomputer and analyzes information received from the power receiving apparatus 500 through the communication section 112 or produces and transmits transmission information to the power receiving apparatus 500 through the communication section 112.

The communication section 112 is formed, for example, from a Bluetooth unit or a ZigBee unit.

Further, similarly to the power receiving apparatus 300 of the second embodiment, the power receiving apparatus 500 includes a power supply controlling switch circuit 250, a charging circuit 301 for charging a battery 301B, a power supply switch 302, a control section 303 and an operation section 304 and additionally includes a communication section 501.

The charging circuit 301 notifies the control section 303 of a residual charging amount or battery remaining amount of the battery 301B and of a charged up state, a little different from that in the second embodiment.

In the present fourth embodiment, the control section 303 transmits the residual charging amount or battery remaining amount of the battery 301B received from the charging circuit 301 to the power transmitting apparatus 100 through the communication section 501 together with identification information of the power receiving apparatus 500 itself.

In the present fourth embodiment, it is possible for a user to input additional information such as whether or not charging is demanded urgently or charging may be carried out slowly through the operation section 304.

Upon such notification of the residual charging amount, the control section 303 additionally transmits the additional information to the power transmitting apparatus 100.

Further, when the control section 303 receives a notification representing that the battery 301B is charged up from the charging circuit 301, it switches off the power supply controlling switch circuit 250 and transmits a notification that the battery 301B is charged up to the power transmitting apparatus 100 through the communication section 501 together with the identification information of the power receiving apparatus 500 itself.

When the control section 111 of the power transmitting apparatus 100 receives a notification of a residual charging amount or a notification of full charge from the power receiving apparatus 500, then it produces or modifies a charging schedule plan. Then, the control section 111 produces on/off controlling instructions for the power supply controlling switch circuit to each of the plural power receiving apparatus in accordance with the charging schedule plan and then transmits the controlling instructions through the communication section 112.

Processing Operation of the Control Section 111 of the Power Transmission Apparatus 100

Figure 7:
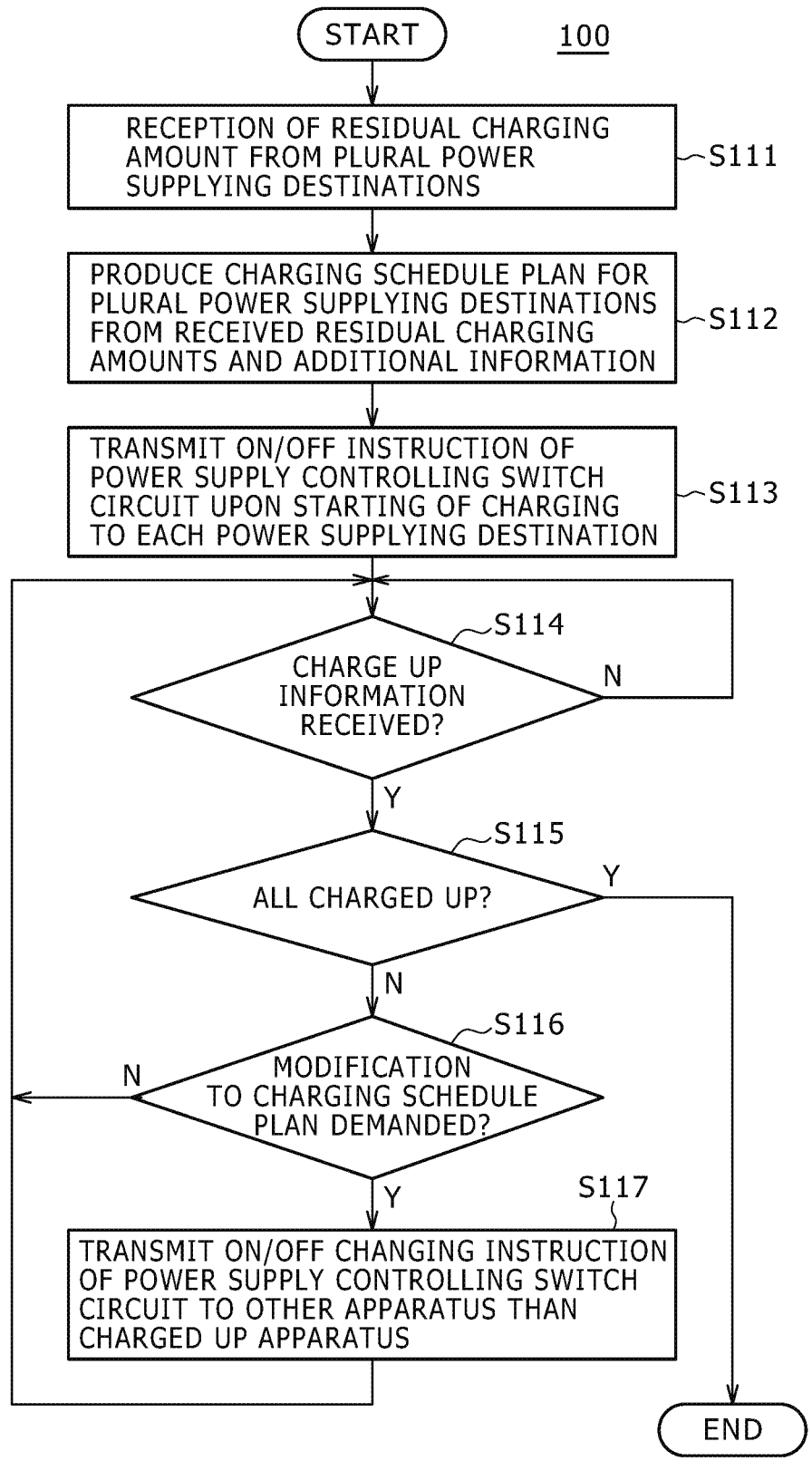
FIG. 7 is a flow chart illustrating an example of processing operation of a power transmitting apparatus in the charging system of FIG. 6.

FIG. 7 is a flow chart illustrating processing operation executed by the control section 111 of the power transmitting apparatus 100.

The processing operation in FIG. 7 is carried out when plural power receiving apparatus 500 as power supplying destinations are placed on the charging cradle and the power supply for the charging system is switched on to supply power to the power transmitting apparatus 100.

The control section 111 receives a residual charging amount and additional information to the residual charging amount from the plural power receiving apparatus 500 which are power supplying destinations at step S111 at the communication section 112.

Then, the control section 111 produces a charging schedule plan for the plural power receiving apparatus 500 from the received residual charging amounts and additional information at step S112.

In particular, the control section 111 recognizes identification information of each power receiving apparatus from the received information and then checks the residual charging amount, emergency for charging and so forth of each power receiving apparatus. Then, the control section 111 produces an optimum charging schedule plan based on the received information and determines, in accordance with the charging schedule plan, which power supply controlling switching circuit 250 is to be switched on or off in the power receiving apparatus.

Then, the control section 111 transmits the determined on/off controlling information for the power supply controlling switching circuits 250 of the power receiving apparatus 500 to the respective power receiving apparatus 500 in a matched relationship with the identification information through the communication section 112 at step S113.

Then, the control section 111 monitors reception of charge up information from any power receiving apparatus 500 at step S114 and decides, if it is decided that such charge up information is received, whether or not all of the power receiving apparatus 500 are charged up at step S115.

If it is decided at step S115 that not all of the power receiving apparatus 500 are charged up, then the control section 111 decides whether or not the charging schedule plan need be revised for those power receiving apparatus 500 which are not charged up at step S116. In particular, since there possibly is a case wherein, for example, while the battery is not charged up, the power supply controlling switching circuit 250 in an off state need be changed to an on state, the necessity for the change and so forth is decided.

If it is decided at step S116 that the charging schedule plan need not be revised, then the processing of the control section 111 returns to step S114.

On the other hand, if it is decided at step S116 that the charging schedule need be revised, then the control section 111 re-produces a charging schedule plan for the power receiving apparatus other than the power receiving apparatus which is or are charged up. Then, the control section 111 produces, in accordance with the re-produced charging schedule plan, an on/off controlling instruction for each of the power supply controlling switching circuit 250 of the power receiving apparatus 500 other than those power receiving apparatus 500 which is or are charged up and transmits the on/off controlling instruction to the pertaining power receiving apparatus 500 at step S117. Then, the processing returns to step S114 to repetitively carry out the processes at the steps beginning with step S114.

If it is decided at step S115 that all of the power receiving apparatus 500 are charged up, then the control section 111 switches off the main power supply to the power transmitting apparatus 100 and then ends the processing routine.

Processing Operation of the Control Section 303 of the Power Receiving Apparatus 500

Figure 8:
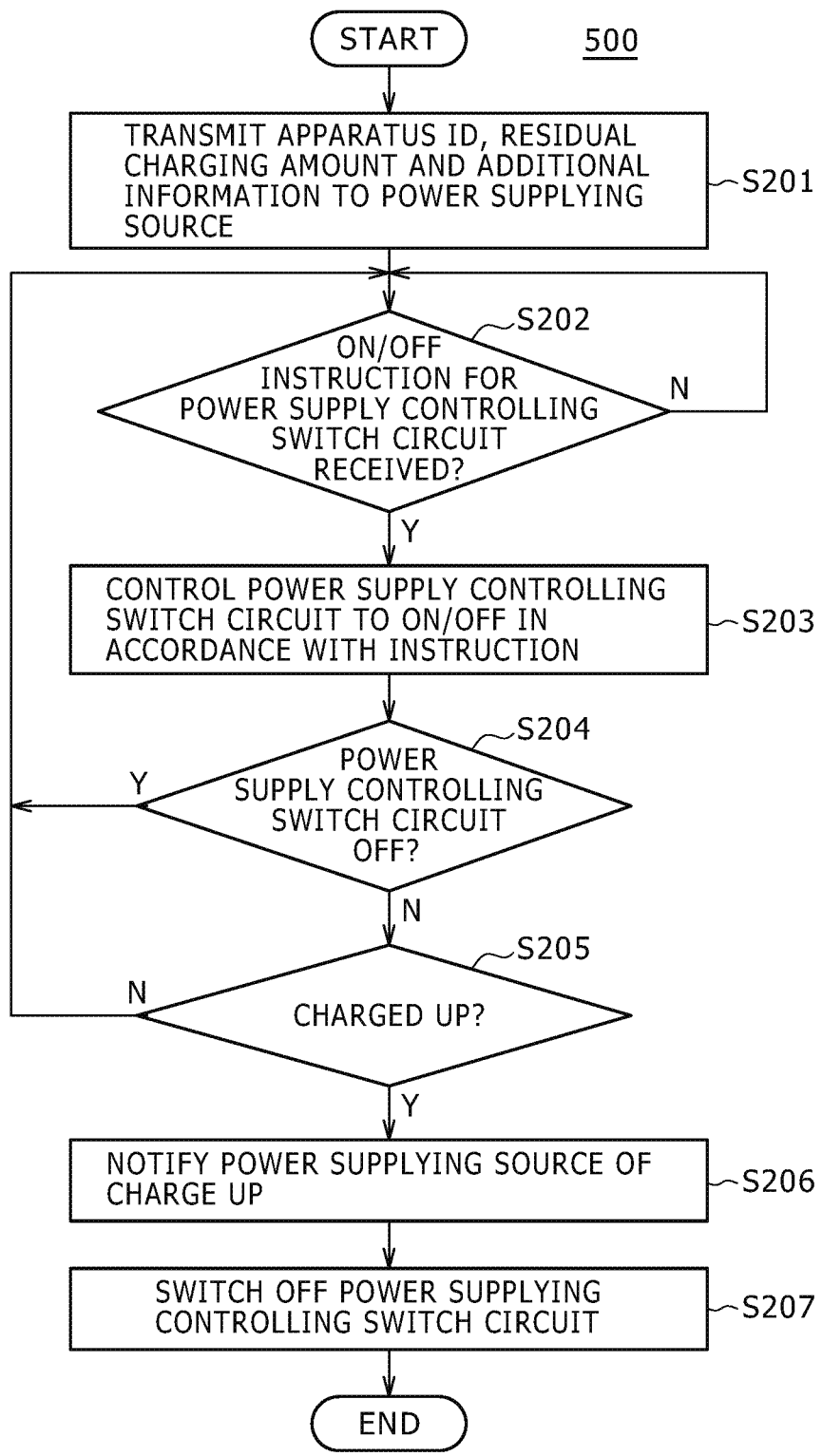
FIG. 8 is a flow chart illustrating an example of processing operation of a power receiving apparatus in the charging system of FIG. 6.

FIG. 8 illustrates processing operation to be executed by the control section 303 of the power receiving apparatus 500.

The control section 303 transmits identification information (ID) of the power transmitting apparatus 100 itself, a residual charging amount and additional information to the power transmitting apparatus 100 which is a power supplying source through the communication section 501 at step S201.

Then, the control section 303 decides whether or not a switching on or off instruction for the power supply controlling switching circuit 250 from the power transmitting apparatus 100 is received through the communication section 501 at step S202.

If it is decided at step S202 that such a switching on or off instruction for the power supply controlling switching circuit 250 is not received, then the control section 303 repetitively carries out the process at step S202.

On the other hand, if it is decided at step S202 that a switching on or off instruction for the power supply controlling switching circuit 250 is received, then the control section 303 controls switching on or off of the power supply controlling switching circuit 250 in accordance with the received instruction at step S203.

Then, the control section 303 decides at step S204 whether or not the power supply controlling switching circuit 250 is off. If it is decided that the power supply controlling switching circuit 250 is off, then the processing returns to step S202 to repetitively carry out the processes at the steps beginning with step S202.

On the other hand, if it is decided at step S204 that the power supply controlling switching circuit 250 is not off, then the control section 303 decides whether or not the battery 301B is charged up at step S205.

If it is decided at step S205 that the battery 301B is not charged up, then the processing of the control section 303 returns to step S202 to repetitively carry out the processes at the steps beginning with step S202.

On the other hand, if it is decided at step S205 that the battery 301B is charged up, then the control section 303 transmits charge up information together with the ID of the power receiving apparatus 500 itself to the power transmitting apparatus 100 which is a power supplying source through the communication section 501 at step S206.

Further, the control section 303 changes over the power supply controlling switching circuit 250 to an off state at step S207 and then ends the processing routine.

Other Embodiments and Modifications

It is to be noted that, in the description of the embodiments given above, only a case is described wherein the power receiving apparatus 200 in which the power supply controlling switch is in an off state repeats ac magnetic field energy from the power transmitting apparatus 10 to a different power receiving apparatus. However, in a situation wherein the power supply controlling switch is in an off state in a plurality of power receiving apparatus 200, it sometimes occurs that a power receiving apparatus transmits alternating current magnetic field energy transmitted thereto from a different power receiving apparatus which operates as a repeating apparatus to a further different power receiving apparatus.

Further, although a case is described wherein the power transmission system of the fourth embodiment described above is a charging system, the present embodiment is not limited to this. For example, each of the plural power receiving apparatus may not include a rechargeable battery but may include a function for issuing a notification regarding whether or not the power receiving apparatus itself need operate to the power transmitting apparatus. On the other hand, the power transmitting apparatus may include a function for issuing an instruction for on/off control of the power supply controlling switching circuit of the power receiving apparatus based on the notification.

With such a power transmission system as just described, the power transmitting apparatus monitors the information regarding whether or not the power transmitting apparatus need operate from the power receiving apparatus and issues an instruction for on/off control of the power supply controlling switching circuit so that suitable power supply can be usually carried out for any power receiving apparatus for which power supply is demanded.

Further, while, in the embodiments described above, the excitation element 22 is provided between the resonance element 21 and the rectification circuit 23 so that impedance conversion is carried out to carry out effective ac power transmission, the excitation element may be omitted.

In particular, while, in this instance, both terminals of the resonance element 21 are connected to one and the other one of the input terminal of the rectification circuit 23, in the present embodiment, the power supply controlling switch is provided between one of both terminals of the resonance element 21 and one of the input terminals of the rectification circuit 23.

Further, the power supply controlling switch in this instance is changed over to a state wherein ac current from the resonance element 21 is supplied to the rectification circuit 23 when supply of the power from the power transmitting apparatus is received by the power receiving apparatus. Further, when supply of the ac current from the resonance element 21 to the rectification circuit 23 is to be blocked, the power supply controlling switch cuts off the connection between one of the terminals of the resonance element 21 and one of the input terminals of the rectification circuit 23 and changes over so that both terminals of the resonance element 21 are connected to each other to form a loop coil. Consequently, the resonance element 21 is placed into a state wherein it can carry out magnetic field resonance coupling with a different resonance element.

It is to be noted that, while a case wherein a resonance relationship between resonance elements is magnetic field resonance is described in the description of the embodiments, the present invention can be applied also to electric field resonance.

The present application contains subject matter related to that disclosed in Japanese Priority Patent Application JP 2009-170805 filed in the Japan Patent Office on Jul. 22, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A power receiving apparatus comprising:
an excitation element;
rectification circuitry configured to rectify alternating current of a specific resonance frequency to generate a direct current;
switching circuitry configured to cut off a supplying path of said alternating current to said rectification circuitry; and
a resonance element having said specific resonance frequency and configured to
couple in a first non-contacting relationship to a first resonance element through a first resonance relationship, couple in a second non-contacting relationship to a second resonance element through a second resonance relationship, and couple in a third non-contacting relationship to said excitation element through electromagnetic induction, wherein said resonance element is coupled to said first resonance element and said second resonance element when said supplying path of said alternating current to said rectification circuitry is blocked by said switching circuitry, and wherein said resonance element is configured to hold a current path in a form of a loop to maintain said coupling to said first resonance element and said second resonance element when said supplying path of said alternating current to said rectification circuitry is blocked by said switching circuitry.

2. The power receiving apparatus according to claim 1, wherein to induction current which flows to said excitation element through said electromagnetic induction coupling between said resonance element and said excitation element being supplied to and rectified by said rectification circuitry, wherein said switching circuitry being provided at a position at which said switching circuitry carries out cutoff control of a supplying path of said induction current from said excitation element to said rectification circuitry.

3. The power receiving apparatus according to claim 1, wherein said switching circuitry is controlled to switch in response to a manual operation by a user.

4. The power receiving apparatus according to claim 1, further comprising:

a load configured to receive said direct current;

instruction inputting circuitry configured to input an instruction to deactivate said load; and control circuitry configured to control said switching circuitry to cut off supply of said alternating current through said supplying path to said rectification circuitry in response to receiving said instruction input via said instruction inputting circuitry.

5. The power receiving apparatus according to claim 1, further comprising:

a rechargeable battery;

a charging circuit configured to charge said rechargeable battery with said direct current that is generated by said rectification circuitry;

detection circuitry configured to detect that said rechargeable battery is charged up; and control circuitry configured to control said switching circuitry to cut off supply of said alternating current when said detection circuitry detects that said rechargeable battery is charged up.

6. The power receiving apparatus according to claim 1, further comprising:

radio communication circuitry, wherein said switching circuitry is controlled to switch based on instruction information received by said radio communication circuitry.

7. A power transmission system, comprising:

a power transmitting apparatus including a first resonance element having a specific resonance frequency, and frequency signal generation circuitry configured to supply an alternating current of said specific resonance frequency to said first resonance element; and a plurality of power receiving apparatuses, each of said plurality of power receiving apparatuses including rectification circuitry configured to rectify a second alternating current of said specific resonance frequency to generate a direct current, wherein one of said plurality of power receiving apparatuses further includes an excitation element, switching circuitry configured to cut off supply of said second alternating current to said rectification circuitry, and a second resonance element having said specific resonance frequency and configured to couple in a first non-contacting relationship to said first resonance element through a first resonance relationship, couple in a second non-contacting relationship to a third resonance element through a second resonance relationship, said third resonance element is different than said first resonance element, and couple in a third non-contacting relationship to said excitation element through electromagnetic induction, wherein said second resonance element is coupled to said first resonance element and said third resonance element when a supplying path of said alternating current to said rectification circuitry is blocked by said switching circuitry, and wherein said second resonance element is configured to hold a current path in a form of a loop to maintain said coupling to said first resonance element and said third resonance element when said supplying path of said alternating current to said rectification circuitry is blocked by said switching circuitry.

8. The power receiving apparatus according to claim 1, wherein said switching circuitry is a single switching circuitry directly connecting said resonance element to said rectification circuitry.

9. The power transmission system according to claim 7, wherein a second one of said plurality of power receiving apparatuses further includes a second excitation element, and said third resonance element having said specific resonance frequency and configured to couple in a first non-contacting relationship to said first resonance element through a first resonance relationship, and couple in a second non-contacting relationship to said second resonance element through a second resonance relationship, and couple in a third non-contacting relationship to said second excitation element through electromagnetic induction.

10. The power transmission system according to claim 9, wherein said second one of said plurality of power receiving apparatuses further includes a second switching circuitry configured to cut off supply of said second alternating current to said rectification circuitry, said second switching circuitry is a single switching circuitry directly connecting said third resonance element to said rectification circuitry, wherein said third resonance element is configured to couple to said first resonance element and said second resonance element when said supplying path of said second alternating current to said rectification circuitry is cut off by said second switching circuitry, and wherein said third resonance element is configured to hold a current path in a form of a loop to maintain said coupling to said first resonance element and said second resonance element when said supplying path of said second alternating current to said rectification circuitry is blocked by said second switching circuitry.

11. The power transmission system according to claim 7, wherein
induction current which flows to said excitation element through said electromagnetic induction coupling between said second resonance element and said excitation element being supplied to and rectified by said rectification circuitry,
wherein said switching circuitry being provided at a position at which said switching circuitry carries out cutoff control of a supplying path of said induction current from said excitation element to said rectification circuitry.

12. The power transmission system according to claim 7, wherein said switching circuitry is controlled to switch in response to a manual operation by a user.

13. The power transmission system according to claim 7, wherein said one of said plurality of power receiving apparatuses further includes a load configured to receive said direct current;
instruction inputting circuitry configured to input an instruction to deactivate said load; and
control circuitry configured to control said switching circuitry to cut off supply of said second alternating current through said supplying path to said rectification circuitry in response to receiving said instruction input via said instruction inputting circuitry.

14. The power transmission system according to claim 7, wherein said one of said plurality of power receiving apparatuses further includes
a rechargeable battery;
a charging circuit configured to charge said rechargeable battery with said direct current that is generated by said rectification circuitry;
detection circuitry configured to detect that said rechargeable battery is charged up; and
control circuitry configured to control said switching circuitry to cut off supply of said second alternating current when said detection circuitry detects that said rechargeable battery is charged up.

15. The power transmission system according to claim 7, wherein said one of said plurality of power receiving apparatuses further includes
radio communication circuitry, wherein said switching circuitry is controlled to switch based on instruction information received by said radio communication circuitry.

* * * * *